Jan. 27, 1970     J. INGLIN-KNÜSEL     3,492,388
METHOD OF PREPARING PRESSED PLATES
Filed Jan. 10, 1967
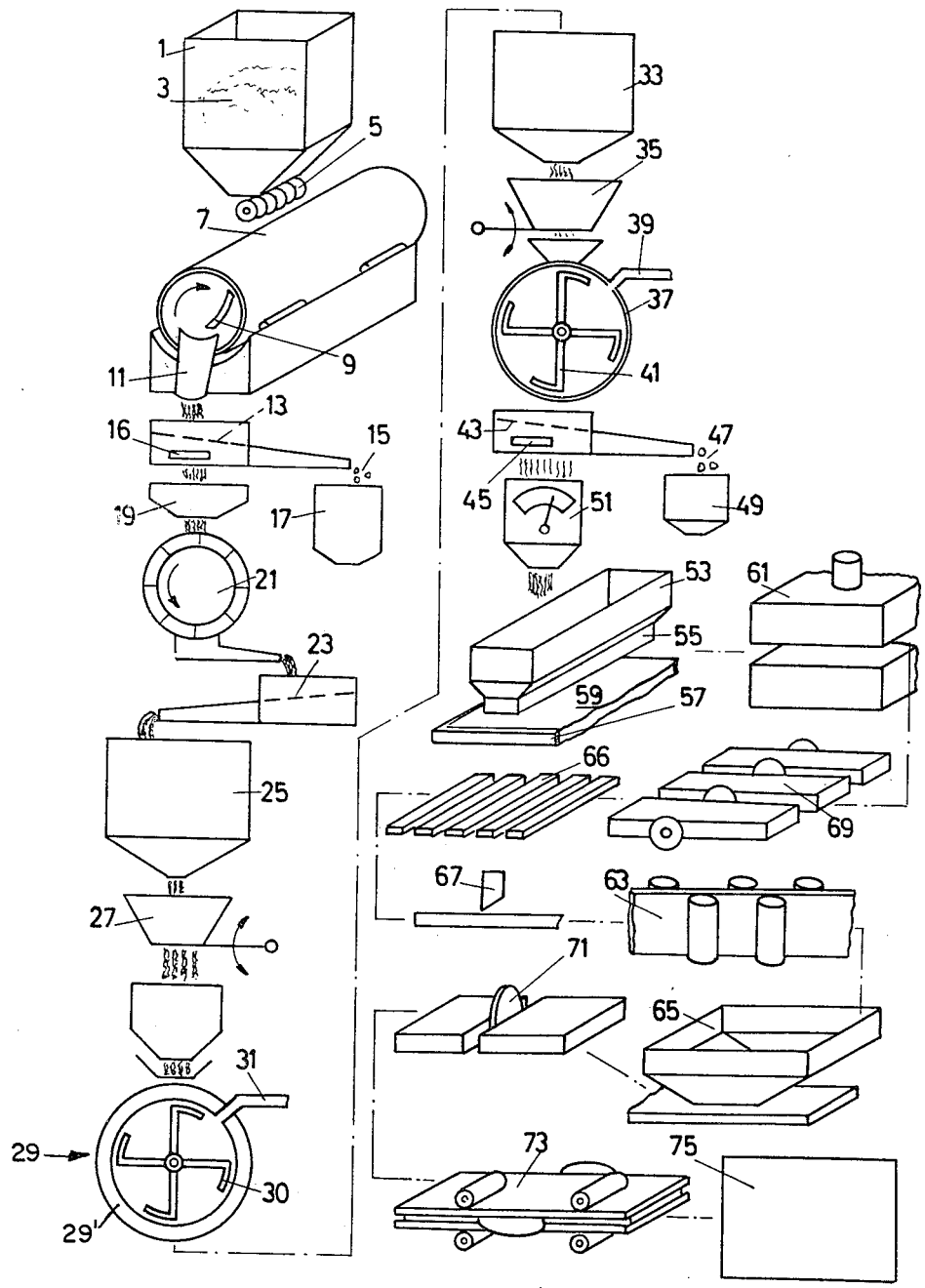
INVENTOR.
BY United States Patent Office 3,492,388
Patented Jan. 27, 1970

3,492,388
METHOD OF PREPARING PRESSED PLATES
Josef Inglin-Knüsel, Axenfels, Fluelen, Uri, Switzerland, assignor to Urlit A.G., Fluelen, Uri, Switzerland
Filed Jan. 10, 1967, Ser. No. 608,350
Claims priority, application Switzerland, Jan. 13, 1966, 436/66
Int. Cl. B29j 5/04; D21j 3/00
U.S. Cl. 264—129                    29 Claims

ABSTRACT OF THE DISCLOSURE

A method of producing a pressed plate by first mixing a particulate, preferably cellulosic material, with a non-binding impregnant such as paraffin in liquid or emulsion form; thereafter admixing a hardenable synthetic resin binder and subjecting the thus formed mixture to heat and pressure so as to transform the same, under simultaneous hardening of the binder, into a pressed plate.

BACKGROUND OF THE INVENTION

Pressed plates formed, for instance, by application of heat and pressure to an intimate mixture of wood chips and a hardenable binder material are well known. These plates are suitable for many purposes, however, there exists a need for plates of this type which are relatively hard, moisture-resistant and impact-resistant. These and other characteristics of pressed plates are improved in accordance with the present invention.

SUMMARY OF THE INVENTION

The present invention is directed to a method of producing pressed plates which are relatively hard, moisture resistant, preferably will not accept electrostatic charges, are substantially free of pores, and have an abrasion resistance which is greater than that of wood. The plates of the present invention do not deteriorate during prolonged storage or use, generally are not flammable at temperatures below about 500° C., and are resistant against weak acids.

According to the present invention, wood chips or other absorbent particles are first, at least superficially, impregnated with a non-binding impregnant such as paraffin or the like, and the thus formed mixture is then combined with a conventional hardenable synthetic resin binder to form a material which can be compressed at elevated temperatures to form a pressed plate of the above-described improved characteristics. The first mixture may be formed of the particulate absorbent material and the non-binding impregnant alone or may also include a portion of the hardenable synthetic resin. However, in any event, subsequent to admixing the paraffin or the like, all or part of the hardenable synthetic resin will be admixed in order to form the wood chip cake or the like which is then subjected to heat and pressure to be converted into the compressed plate.

The preliminary impregnation with a non-binding impregnant such as paraffin will cause a sliding motion of the particles during compression and this will result in an extraordinary high degree of homogeneity and high density of the plate structure. It also seems that certain chemical reactions take place during the hot-pressing of the composite mixture of the present invention, however, the invention is not to be considered limited to any such reaction.

The present invention is thus concerned with a method of producing pressed plates which comprises the steps of forming an intimate first mixture of an absorbent particular material and of a non-binding impregnant for the absorbent material, whereby the impregnant is admixed in liquid of emulsion form, followed by intimately mixing the thus formed first mixture with a hardenable synthetic resin binder, and thereafter subjecting the thus formed second mixture to heat and pressure so as to transform the second mixture into a pressed plate under simultaneous hardening of the hardenable synthetic resin binder. The present invention also encompasses the thus produced pressed plate.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing schematically illustrates in the manner of a flow-sheet an arrangement for carrying out the method of the present invention.

DESCRIPTION OF THE PREFERRED EMBODIMENTS

The present invention is concerned with a pressed plate and a method of making the same. The pressed plate of the present invention consists essentially of the same materials as conventional pressed plates, namely a particulate material which preferably is porous so that it can be impregnated and in many cases will be a cellulosic material such as sawdust, wood waste, wood chips or waste accruing in the working up of straw, grass and cotton, or linters such as cotton linters, or jute; and a hardened binder which is mixed with the particulate material while in hardenable, preferably fluid, condition and which upon application of heat and pressure to the "cake" formed of the wood chips or the like and the hardenable binder will result in the formation of a pressed plate under simultaneous hardening of the hardenable binder.

Such hardenable binders are well known to those skilled in the art and include synthetic resins such as diphenols, urea resins, polyester resins, polyethylene resins, epoxy resins, aldehyde resins, aminoplasts, alkyl resins, alkyd-type resins, for instance those known under the trademark "Glyptal," coumarone resins, polyolefins, polystyrenes, polyacrylic acid esters, polyacrylnitriles, polyamides, polymethacrylic acid esters, polyester resins, mixed polymerisates, copolymers of butadiene and styrene such as are known as styrene-butadiene rubber, chlorinated rubber, polyvinylidene chloride resins, for instance such as are known under the trademark "Saran," fluoroethylene resins, for instance such as are known under the trademark "Teflon," silicons, etc.

In may cases, a hardening agent for the respective synthetic resin is also admixed and such hardening agents are well known to those skilled in the art and include certain acids, as f.e. anhydrous carbolic acid, nitric acid, sulfuric acid, hypochloric acid, oxalic acid or the like, peroxides, amines, etc. which are admixed in combination with certain hardenable synthetic resins such as phenol-urea resins, etc. in order to cause or speed up hardening of the respective resin.

However, according to the present invention, the pressed plate additionally includes a non-binding impregnating agent which is capable of acting in the nature of a lubricant and which may be, for instance, paraffin, oil, fat, glycerol, or a synthetic resin formed by esterification of phthalic acid with glycerol. It is possible thereby also to utilize resins in which the OH groups of the glycerol are only partly reacted with the residues of polybasic acids and the free valences are then saturated with higher fatty or resinic acids.

The admixture of these non-binding, lubricating, impregnating agents may be carried out while these agents are in liquid form, or, for instance in the case of paraffin, the non-binding-lubricating agent may be applied in the form of an emulsion, preferably an aqueous emulsion thereof.

Preferably, the particulate material which is to be impregnated is first adjuster or dried to a relatively low water content, for instance in the case of wood chips to a water content of 5% to 3%, and most preferably to a water content of below 2%.

Thereafter, the particulate material is intimately mixed with the non-binding, lubricating, impregnating agent, and thereafter the hardenable binder material is admixed.

However, it is also possible to first admix the non-binding, lubricating, impregnating agent together with a portion of the hardenable binder. However, an additional portion of the hardenable binder should then be admixed subsequently thereto.

The thus formed mixture which, if required, may also include a conventional hardening agent for the hardenable resin is then subjected to hot-pressing so that the mixture will be transformed into a pressed plate.

Preferably, the admixture of hardenable binder material will be such that the hardened resin content of the plate will be more than 7% by weight and, preferably, the admixture of the lubricating, non-binding impregnant will be such that the content thereof in the completed pressed plate will amount to about 3.5% by weight.

By way of example, the method of producing the pressed plate of the present invention may be described, with reference to the drawing, as follows:

The particulate material, for instance sawdust, is stored in hopper 1 from which the sawdust 3 is withdrawn by means of a dosing screw 5 and passed to a rotating drum drier 7 in which the water content of the sawdust or the like is reduced to 3% or below, preferably to up to 2% of residual moisture.

The thus dried sawdust is then withdrawn from drier 7, for instance by means of withdrawal baffle 9, and is passed by way of funnel 11 onto a shaking screen 13 on which the particles of sufficiently small size are separated from larger particles. The larger particles are collected in hopper 17 and may be used for other purposes, possibly may be subjected to grinding and then reintroduced into hopper 1. A magnetic device, which may include an electromagnet or a permanently magnetic body 16, is associated with screen 13 in order to withdraw from the screened sawdust any iron particles which could lead to damage of the machinery or ignition of the material. Preferably, screen 13 has a mesh width of about 5 mm. The wood material which has passed through screen 13 flows then through funnel 19 into comminuting mill 21, which may be a cutting mill or a hammer mill, or the like, in which the wood particles are comminuted so as to be capable of passing through a screen having a mesh width of between 2.5 and 3 mm.

Preferably, comminution is carried out in a per se conventional manner so that the comminuted particles will all be granulated, for instance substantially square-shaped, more or less the shape of miniature bricks, with edge length rations of, for instance, 1:1.5, 1:2:2, 2:3:4.

Thereafter, the comminuted material is screened once more by being passed through screen 23 having a mesh width of between about 0.5 mm., and the screened material is then introduced into hopper 25.

It is preferred to also screen out particles of very small dimensions, such as particles having a maximum dimension of about 1 mm., since these very small particles, if retained, would absorb excessive amounts of the hardenable resin and generally would show poor color retention.

From hopper 25, the thus comminuted and screened particulate material passes over volumetric scale 27 to first mixer 29.

Mixer 29 preferably is provided with suitable heating means, for instance, a jacket 29' through which the heating fluid may pass. Mixer 29 is provided with rotating mixing blades 30 and with a further inlet 31 for introduction of the, preferably fluid, non-binding, lubricating, impregnating agent.

The diameter of the mixing drum of mixer 29 may be, for instance, 1200 mm., and the axial length of the drum, for instance, 2000 mm. During operation, the drum may rotate, for instance, at between 80 and 100 r.p.m.

After mixing the particulate material with the non-binding impregnating agent, the thus formed mixture, i.e. the wood particles which are at least superifically impregnated with the non-binding impregnating agent, are passed into hopper 33 and from there through volumetric scale 35 into second mixer 37.

Second mixer 37 is substantially constructed like mixer 29 and communicates with conduit 39 through which the hardenable synthetic resins, if required a hardener therefor, and if desired a coloring material, are introduced. The mixture which is thus formed in mixer 37 is then thoroughly mixed by rotating mixing blades 41. Hardenable resin and hardener may be introduced simultaneously or separately.

The homogeneous mixture formed in mixer 37 is then passed through a shaking screen 43 having a mesh width of between about 3 and 4 mm., for separating therefrom particles and agglomerations of larger dimensions. A magnetic device 45 is associated with screen 43 in order to catch ferrous bodies.

The screened-out large particles are collected in hopper 49 and the particles of the desired size fraction flow by way of scale 51 into a conventional distributing device 53 from which the mass of particles is poured in a homogeneous distribution through spout 55 onto a supporting sheet 57. The distributing device 53 is subjected not only to vibration in order to achieve uniformity of the treated sawdust which flows out of spout 55, but is also reciprocally moved in longitudinal direction of supporting sheet 57.

As soon as the desired height of the layer of treated sawdust 59, or wood chips is reached, the thus formed layer, supported by sheet 57, is passed into hydraulically actuated press 61 including press plates which are heated, for instance, electrically or by means of a fluid medium.

It is also possible, and frequently preferred, to subject the layer or cake formed on supporting sheet 57 to a first cold-pressing at an absolute pressure of between about 11 and 21 atmospheres, which cold-pressing is carride out in an additional press (not shown) and precedes the pressing in hot-press 61.

Press 61 may be a single or multiple effect press in which one or more plates, for instance, between three and six plates, are simultaneously pressed at a temperature of preferably between 90° C. and 150° C. and at a pressure of usually at least about 35 atmospheres and preferably about 50 atmospheres.

In this manner, a hot-pressed plate is formed which is suitable for certain commercial purposes, which, however, has not yet been ground.

The thus formed crude plates are then cut into strips in milling cutter 69, and the thus formed strip-shaped plates are then subjected to drying under completion of hardening while being supported on rack 66. Such drying may be carried out, for instance, in air for a period of twelve hours, whereby the air preferably will have a temperature of between 10° C. and 25° C. and a relative moisture content of between 40% and 60%.

The thus dried plates are then passed through planing machine 67 and from there through a grinder 63 wherein both faces of the plate are ground while these faces extend in vertical direction.

Immediately thereafter, the crude plate passes through impregnating device 65 wherein an outer impregnant or conventional sealing agent is applied to the ground surfaces so as to make the same water and dirt repellent. Such sealing is preferably repeated several times, for instance, up to four times.

Thereafter, the strips are cut in a cutter 71 into plates, for instance, of the dimensions conventionally used for making floor tiles.

If it is desired to use the plates as floor tiles, the same are preferably also passed through a milling cutter 73 in order to provide the side edges of the plate with suitable grooves and ribs. The thus completed floor tiles are then packed in a conventional manner as indicated at 75.

The process as described above may also be carried out, for instance, by withdrawing sawdust from hopper 1 and drying the same in drier 7 to a residual moisture content of 1.5%. The dried sawdust is then comminuted in impact or hammer mill 21 to a maximum particle size of below 3.0 mm.

In mixer 29, molten paraffin or an aqueous paraffin emulsion is admixed to the comminuted sawdust particles in an amount of 4.5 kg. of paraffin for 120 kg. of thus dried and comminuted sawdust. Simultaneously, a urea resin including a hardening-retarder such as sodium hydroxide is introduced in an amount of 9 kg. for 120 kg. of dried sawdust and the entire mixture, which does not include a hardener for the urea resin is then mixed at a temperature of between about 90° C. and 95° C.

The thus formed first mixture is then collected in hopper 33 and eventually reaches second mixer 37 in which a suitable coloring material, urea resin and hardener, are admixed. As hardener may serve ammonium chloride, an acid, sodium chloride or the like.

Between 21 and 26 kg. of resin and hardener are admixed in the second mixer to the 133.5 kg. of the mixture obtained in the first mixture, and in addition thereto, if desired, a relatively small proportion of a dyestuff solution.

The thus formed second or final mixture is then poured as a fine veil onto supporting metal sheet 57, forming thereon cake 59. Depending on the final thickness of the pressed plate, which generally will be between about 2 and 15 mm., the height of the layer or cake formed on sheet 57 will be between about 15 and 80 mm.

The thus formed cake is then pressed in press 61 at a pressure of about 50 atmospheres and a temperature of between about 100° C. and 130° C., whereby lower pressures and temperatures, within the above range, are used for producing relatively thin plates and higher temperatures and pressures for producing relatively thick plates.

In this manner, the crude plate is formed.

The sealing or surface impregnation of the crude plates is carried out in conventional manner.

The urea resin of the present example may also be replaced, for instance, by a phenolic resin. In the case of phenolic resin, the temperature in press 61 will preferably be about 140° C. The final mixture which is subjected to hot-pressing will consist of about 70-75% by weight of sawdust, 7-15% of hardenable resin, and about 4% of the non-binding, lubricating impregnant, as well as about 10% water and about 0.6% hardener, as will be described in more detail hereinbelow.

In the manner described above, for instance floor tiles of the desired thickness, length of 20 cm. and width of 10 cm. may be formed, whereby the grooves and ribs in the side faces of the floor tiles permit the forming of a fault-free, continuous, slitless floor or surface.

A preferred composition of the completed pressed plate will be 76.3% by weight sawdust, 10.3% by weight hardened resin, 0.6% by weight hardener, 9.3% by weight water, and 3.9% by weight of the non-binding, lubricating impregnant, for instance paraffin.

Generally, the thickness of the pressed plate will be between 1/7.5 and 1/5 of the thickness of the layer which is subjected to hot compression.

As pointed out above, the water content of the particulate material which in most cases will be a fibrous cellulosic material, prior to being mixed with the non-binding lubricating, impregnating agent should be relatively low, nearly always below 5% and preferably, for instance in the case of sawdust, between 1% and 2%.

The layer which is subjected to hot-pressing generally has a water content of between 15% and 20%, and the finished pressed plate between 8% and 10% (all percent by weight).

The first mixture may consist for instance of:

| | Kg. |
|---|---|
| Sawdust (dry weight) | 118.2 |
| Water | 6.3 |
| Paraffin | 4.5 |
| Hardenable resin (dry weight) | 4.5 |

This first mixture may be divided into three equal parts and to each of the three parts 3.8 kg. resin (dry weight), 3.8 kg. water and 400 g. hardener are added. The hardener is formed of a mixture of 47 kg. of ammonium chloride (serving as hardener) and 14 kg. of a 25% by volume aqueous ammonia solution serving as retarder.

The ratio is about 300 g. hardener and 100 g. retarder in solution of 25% by volume.

In this manner a final mixture is formed consisting of:

| | Kg. |
|---|---|
| Pure sawdust (75.0%) | 39.4 |
| Water (11.3%) | 5.9 |
| Paraffin (2.8%) | 1.5 |
| Hardenable resin (10.1%) | 5.3 |
| Hardener and retarder (0.8%) | 0.4 |

By using fibrous cellulosic material such as sawdust, and paraffin as an example of the non-binding, lubricating, impregnating agent, the final mixture which is to be subjected to hot-pressing preferably will have the following composition:

| | Percent | | |
|---|---|---|---|
| | Min. | Preferred | Max. |
| Water | 7 | 12 | 20 |
| Hardenable resin | 7 | 10 | 15 |
| Sawdust | 70 | 74 | 80 |
| Hardener | 0.2 | 0.6 | 1.0 |
| Paraffin | 2 | 3.4 | 5 |

Assuming that the mixture which is subjected to hot-pressing has the composition indicated as preferred, the hot-pressed plate will be approximately of the following composition:

| | Percent |
|---|---|
| Water | 9.3 |
| Hardened hardenable resin | 10.3 |
| Sawdust | 76.3 |
| Hardener | 0.6 |
| Paraffin | 3.5 |

Coloring material may be incorporated in the final mixture as desired, for instance, in pulverulent form, up to about 2% by weight of the mixture which is subjected to hot pressing.

It is however also possible but with less success to prepare the first mixture with the non-binding impregnating lubricating and water-repellent agent and the binding agent at the same charge in the same mixer.

As filling stuff sand, gypsum or even fine gravel can be used with sawdust replacing as much as 30% of the sawdust.

This inner impregnating agent, usually paraffin wax but also colphony or wood oil acts in its final state in the plate not only water-repellent but also as structural binder.

The hardener is not to be put into the sawdust together with the impregnating agent and the binder, because the temperature for mixing the sawdust and the impregnating agent is as high as 90–100° C., a temperature, at which the hardening would have already occurred. The amount of hardener is sufficient to harden all binder in the composition.

The retarding agent is added to prevent the hardener from acting before the plate is in the press.

Benzyl alcohol, alkyd resin, talcum and silicone oil can also be used as impregnating agent.

Without further analysis, the foregoing will so fully reveal the gist of the present invention that others can by applying curernt knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing pressed plates, comprising the steps of forming a first intimate mixture of absorbent particulate material, a synthetic thermosetting resin which hardens only at the presence of a hardener, and a non-binding lubricating impregnant in fluid form for said absorbent material and said resin mixed thereto; intimately mixing said first mixture with additional synthetic thermosetting resin of the same type as used in said first mixture and a hardener to form a second mixture; and subjecting the said second mixture to heat and pressure so as to transform said second mixture into a pressed plate while hardening said hardenable resin.

2. A method as defined in claim 1, wherein said non-binding lubricant impregnant is selected from the group consisting of oils, fats, glycerol, esters of phthalic acid and glycerol and partial esters of phthalic acid and glycerol wherein unesterified OH groups of glycerol are substituted with higher fatty acids and resinic acids.

3. A method as defined in claim 1, wherein said non-binding lubricant impregnant is admixed in the form of an aqueous paraffin emulsion.

4. A method as defined in claim 1, wherein said synthetic resin is admixed in such an amount that the resin content of said pressed plate equals at least 7% by weight.

5. A method as defined in claim 1, wherein the particles of said absorbent particulate material are of substantially uniform size.

6. A method as defined in claim 5, wherein said absorbent particulate material is subjected to comminution so as to be converted into particles of substantially uniform size and shape, prior to forming said first mixture.

7. A method as defined in claim 1, wherein said absorbent particulate material is selected from the group consisting of sawdust; wood waste; wod chips; straw, grass and cotton waste; linters and jute.

8. A method as defined in claim 1 and including the step of sealing the thus formed pressed plate.

9. A method of defined in claim 1, wherein said absorbent particulate material consists of sawdust having a maximum particle size of 5 mm.

10. A method as defined in claim 9, wherein the maximum particle size of said absorbent particulate material is 3 mm.

11. A method as defined in claim 1, wherein the moisture content of said absorbent particulate material is adjusted to a maximum moisture content of up to 3%.

12. A method as defined in claim 11, wherein said absorbent particulate material is dried at a temperature of at least 80° C. to a moisture content of below 2%.

13. A method as defined in claim 1, wherein a coloring material is incorporated in said second mixture.

14. A method as defined in claim 1, wherein said hardener is ammonium chloride.

15. A method as defined in claim 1, wherein said hot-pressing of said second mixture is carried out at a temperature of between about 90° C.–150° C.

16. A method as defined in claim 15, wherein said temperature is between about 105° C.–130° C.

17. A method as defined in claim 1, wherein said hot-pressing of said second mixture is carried out at a pressure of at least about 35 atmospheres.

18. A method as defined in claim 17, wherein said pressure equals about 50 atmospheres.

19. A method as defined in claim 1, wherein said first mixture is formed of 120 parts by weight of said absorbent particulate material, about 4.5 parts by weight of hardenable resin and about 4.5 parts by weight of paraffin.

20. A method as defined in claim 1, wherein said second mixture is formed of about 40 parts by weight of said first mixture and about 6 parts by weight of hardenable synthetic resin.

21. A method as defined in claim 1, wherein said second mixture of dry material consists of about 70%–75% sawdust, about 7–15% synthetic thermosetting resin and about 5% non-binding impregnant and a hardener.

22. A method as defined in claim 1, wherein said second mixture includes a hardening-retarding agent.

23. A method as defined in claim 20, wherein said hardening-retarding agent is sodium hydroxide.

24. A method as defined in claim 1, wherein said freshly formed pressed-plate is air-dried for at least 10 hours.

25. A method as defined in claim 2, wherein said absorbent particulate material is a cellulosic material, said synthetic thermosetting resin is a phenolic resin, and said hot-pressing of said second mixture is carried out at a temperature below 145° C.

26. A method as defined in claim 25, wherein said hot-pressing is carried out at a temperature of about 135° C.

27. A method as defined in claim 1, wherein a layer of said second mixture is hot-pressed into a pressed plate having a thickness equal to between about 1/7.5 and 1/5 of the thickness of said layer of said second mixture.

28. A method as defined in claim 1 wherein said forming of said first mixture includes heating of same.

29. A method as defined in claim 1, wherein said non-binding lubricating impregnant is in the form of molten paraffin, and wherein the forming of said first mixture is carried out at a temperature of between 90 and 95° C.

References Cited

UNITED STATES PATENTS

| | | | |
|---|---|---|---|
| 2,337,915 | 12/1943 | Menger et al. | 264—109 |
| 3,223,668 | 12/1965 | Stalego | 264—109 |
| 3,287,479 | 11/1966 | Naudain | 264—109 |

ROBERT F. WHITE, Primary Examiner

J. R. HALL, Assistant Examiner

U.S. Cl. X.R.

260—342; 264—118, 122